Jan. 30, 1968  J. J. GREBE  3,365,880
COMBUSTION APPARATUS FOR PRODUCING A HIGH
KINETIC ENERGY WORKING GAS STREAM AND
METHOD OF ITS USE
Filed Oct. 6, 1966  2 Sheets-Sheet 1

INVENTOR.
John J. Grebe
BY
C. Kenneth Bjork
AGENT

Jan. 30, 1968   J. J. GREBE   3,365,880
COMBUSTION APPARATUS FOR PRODUCING A HIGH
KINETIC ENERGY WORKING GAS STREAM AND
METHOD OF ITS USE
Filed Oct. 6, 1966   2 Sheets-Sheet 2
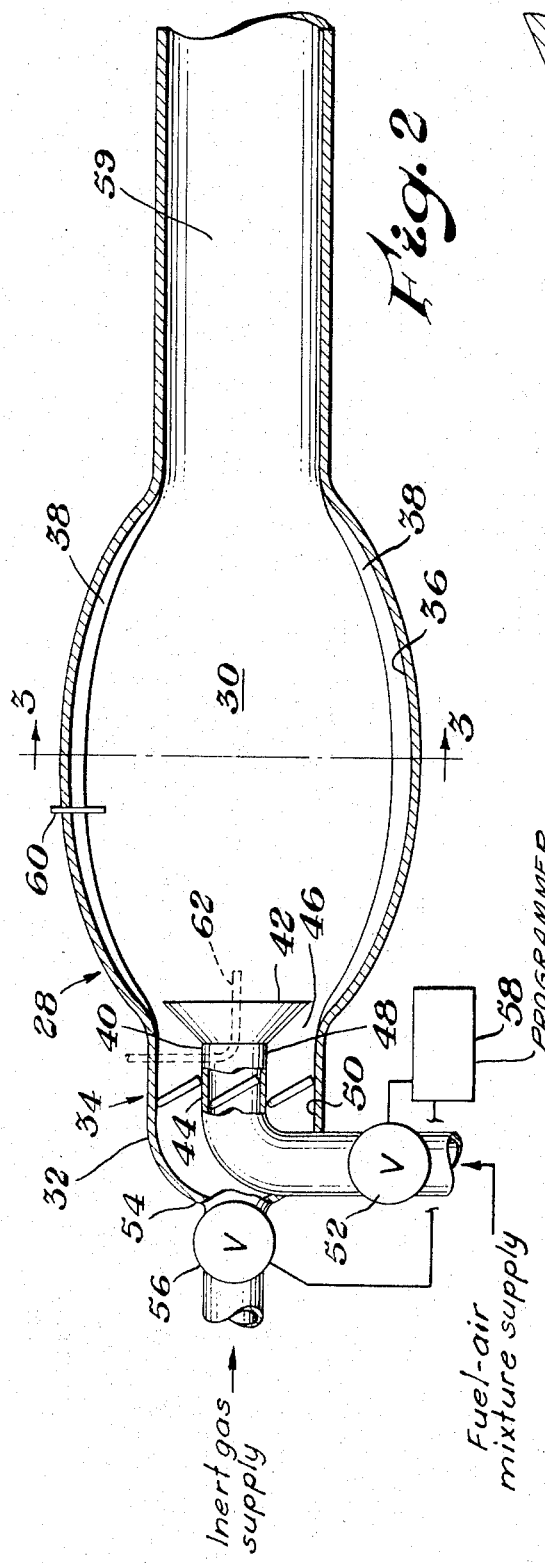
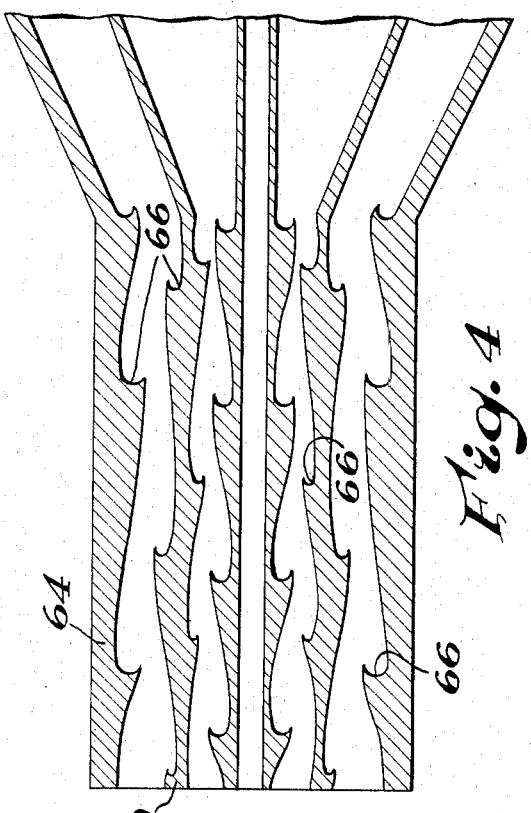
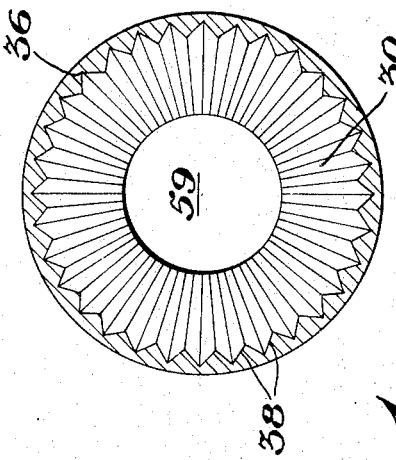
INVENTOR.
John J. Grebe
BY C. Bennett Björk
AGENT United States Patent Office 3,365,880
Patented Jan. 30, 1968

3,365,880
COMBUSTION APPARATUS FOR PRODUCING
A HIGH KINETIC ENERGY WORKING GAS
STREAM AND METHOD OF ITS USE
John J. Grebe, Midland, Mich.
(12430 W. St. Andrews Drive, Sun City, Ariz. 85351)
Filed Oct. 6, 1966, Ser. No. 584,916
6 Claims. (Cl. 60—39.03)

ABSTRACT OF THE DISCLOSURE

The invention is a combustion apparatus and process for generating a high kinetic energy working gas stream wherein a combustion tube is fitted with igniting means, check valve assemblies, fuel-air injection means and supply source, an inert gas supply source and an exhaust. The high energy working gas stream is produced by controllably introducing separately and sequentially predetermined amounts of fuel-air mixture and inert gas into the combustion tube and utilizing the heat of combustion from rapid combustion of the fuel-air mixture to accelerate the inert gas.

---

This application is a continuation-in-part of application Ser. No. 480,519, filed Aug. 17, 1965, which in turn was a continuation-in-part of application Ser. No. 358,945, filed Apr. 10, 1964, now abandoned.

This invention relates to energy conversion and more particularly is concerned with a novel combustion process and apparatus for generating high kinetic energy, high pressure gases. This process is particularly adapted for increasing the operating efficiency of power generators such as automotive drives, jet engines and turbine-electrical generator assemblies.

In conventional energy converting power generating assemblies which operate on hot gases from combustion of a fuel-air mixture, air from the atmosphere is compressed by fan or other compressing means prior to mixing it with fuel before ignition. In such processes, an excess of air, ordinarily from about three to about five times more than that required for complete oxidation of the fuel, is precompressed. The fuel-compressed air mixture for the energy conversion process is injected into burner chambers, singly or in parallel, for the combustion. Because of the large amounts of air which must be compressed prior to ignition, such processes are inefficient. They also suffer from the disadvantage that excessively high temperatures must be used for extra spurts of power. This deteriorates the highly heat resistant, expensive materials required for burners, nozzles and particularly turbine blades or other components to withstand the mechanical stresses at high temperatures. This can be further illustrated by a brief description of a conventional turbojet or turboprop.

In such engines air for combustion from the atmosphere in excess of that required for combustion is precompressed by a mechanically operated compressor. Compressing air to higher pressures in an attempt to further increase efficiency reaches a practical limit for at the higher pressures an accompanying increase in temperature, due to the adiabatic compression, tends to be accompanied by an increase in volume. This in turn increases the energy requirement for such compression. Further, both the initial air compressing and subsequent high pressurizing takes power from the engine itself thereby reducing the total thrust producing energy available for power.

In other conventional earth-bound combustion processes, i.e. steam power plants and hot gas turbine automotive engines, inlet air generally is partially preheated either without or after compression by passing it in heat interchange relationship with the exhaust products.

It is a principal object of the present invention to provide a combustion process giving unexpectedly high kinetic energy and highly efficient energy conversion.

It is another object of the present invention to provide an apparatus and process of jet engine operation giving unexpectedly high thrust which requires markedly less inlet air for combustion than conventional combustion processes.

It is another object of the present invention to provide a combustion process for jet engine operation, turbine-electrical assemblies and the like where substantially complete consumption of combustion air is realized and wherein high kinetic energies and high efficiency are obtained while simultaneously cooling burner metal surfaces, turbine nozzles, turbine blades and the like.

It is a further object of the present invention to provide a combustion process which gives a high summation of kinetic energies wherein cooler gases are intermittently mixed, i.e. slugged, with hot gaseous explosion products in a novel sequence of operating steps.

It is also an object of the present invention to provide an assembly for jet propulsion delivering a maximum in useful thrust effects.

It is a further object of the present invention to provide a process of jet propulsion which can be carried out with light weight apparatus of simple design.

These and other objects and advantages readily will become apparent from the detailed description presented hereinafter when read in conjunction with the drawing in which:

FIGURE 1a–d is a schematic diagram showing schematically the procedural steps for the generation of a high energy working gas stream in a combustion tube following the practice of the present invention;

FIGURE 2 is a sectional view of one embodiment of an apparatus for carrying out the present invention;

FIGURE 3 is a sectional view taken along line 3—3 of FIGURE 2;

FIGURE 4 is a fragmentary sectional view illustrating a modification of the apparatus depicted in FIGURE 2.

Figure 1A:
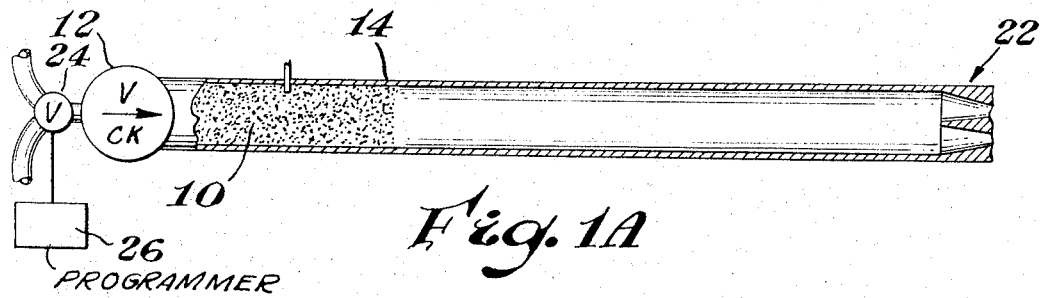
Figure 1B:
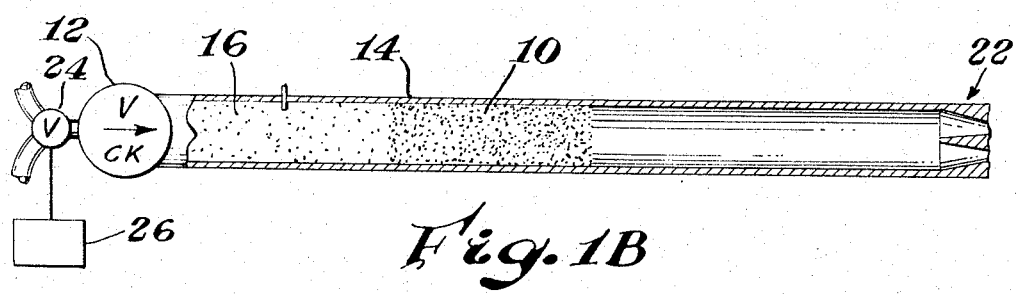
Figure 1C:
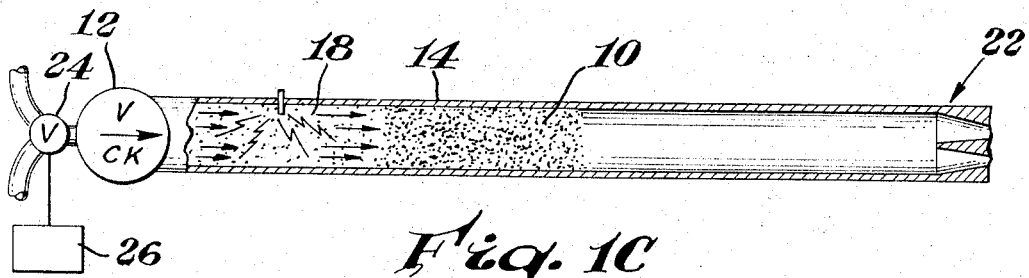
Figure 1D:
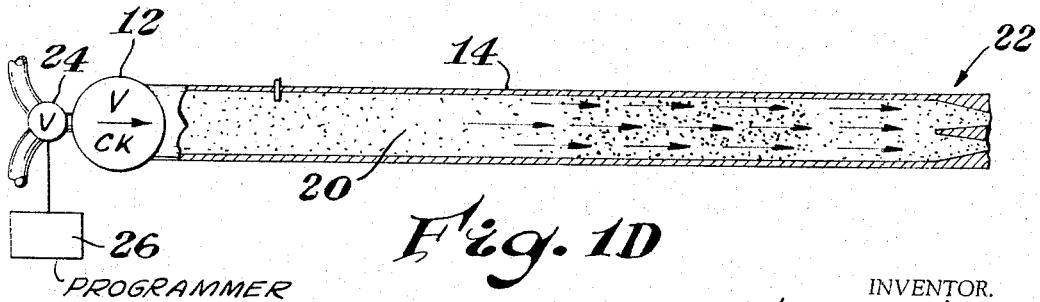

In general in accordance with the present invention, a predetermined quantity of an inert gas 10 from a supply source (not shown) is passed through a check valve 12 into an explosion combustion tube; i.e. explosion chamber, 14 fitted for pulsed explosive ignition of a fuel-air combustion mixture (FIGURE 1a); a mixture 16 of fuel and air from a second supply source (not shown) then is fed into the chamber 14, the quantities of said fuel and air in the mixture 16 being at a ratio to provide an explosive mixture which gives a predetermined gaseous exhaust product temperature and pressure upon substantially instantaneous ignition (FIGURE 1b); the explosive mixture 16 is substantially instantaneously ignited in the chamber 14 thereby providing high temperature-high velocity gaseous combustion products 18 compressed and accelerated by the explosive combustion surge (FIGURE 1c). The hot high velocity compressed and accelerated gaseous combustion products 18 thus become intermittently blended, i.e. slugged, with the cooler inert gas 10 in front (FIGURE 1c). The inert gas mass 10 thereby becomes heated and accelerated by the shock waves from the explosive combustion, i.e. the peak of the explosive energy, providing a resultant high temperature-high velocity working gas stream of the entire gaseous mass 20 which is directed toward a venturi nozzle system 22, for example, with high kinetic energy (FIGURE 1d).

Ordinarily this high velocity working gas stream is directed to a turbine wheel of a turbojet propulsion engine, exhausted through a thrust producing rocket engine exhaust nozzle or fed to a mechanical drive or an electrical power generator as in a power plant or the like.

The resultant gas blend may be subsequently compressed before use, as by a diffuser in the exhaust conduit from the explosion chamber, thus being further heated by adiabatic compression for recovery of heat and more energy.

The additions of inert gas 10 and fuel and air mixture 16 to the combustion tube are carried out on a cyclic basis thereby assuring continuity of operation. Conveniently, as shown, introduction of these components can be controlled by a valve assembly 24 operated by a programmer 26.

The terms "intermittently blended" or "slugged" as used herein mean that the cooler gas or air is injected into the combustion chamber or "gun" of the system as a "slug" or mass which is then compressed, heated and accelerated by the following high temperature, high velocity gaseous explosive combustion products. This intermittent slugging is continued whereby the cooler gas is compressed and heated in the gun by successive explosive combustions which follow each slug of cooler inert gas.

By use of the intermittent blending or slugging operation of cooler gases with the hot explosion products from the substantially instantaneous ignition of the explosive fuel-air mixture unexpectedly high kinetic energies are realized from combustion of relatively small amounts of fuel thereby providing for highly efficient operation without excessively heating the combustion tube.

Ordinarily, the cooler inert gas for blending with the explosion combustion products can be any gaseous material that does not attack the component parts of the system. Conveniently, this inert "blend gas" can be steam, air, exhaust products as from an engine exhaust or boiler flue gas, partially expanded gaseous products from turbine operation and the like. Usually, the inert blend gas is air obtained from the atmosphere or recycled partially expanded exhaust or used process gases or a combination of air and recycle used process gases. These latter recycle materials are particularly suitable since they have a higher heat capacity and may be at a somewhat elevated pressure.

The actual amount of blend gas to be used is determined from the total volume of working gas desired at a predetermined operating temperature and pressure. Amounts of blend gas ranging from about 0.25 to about 8 times and preferably from about 1 to about 5 times the combustion air stream are satisfactory.

One way of introducing inert gas and fuel-air mixtures into the combustion tubes is to partially pressurize these by a fan, compressor, ram jet inductor, or another explosive gas gun in series, e.g. and then force these into the tube through the one way check valve or shock wave traps.

The actual metering of the fuel or fuel-air mixture and inert gas into the combustion tube in a predetermined sequence can be achieved by controlled valving using electrical, hydraulic, mechanical or other systems which in turn are programmed or otherwise meshed or synchronized with the combustion initiation operation. The ignition of the fuel vaporized or atomized into the burner tube can be by single spark, multiple spark, spark discharge along the length of the combustion chamber or other igniting means such as radiant energy absorbers which can be ignited by a high energy radiant energy discharge and in turn ignite the fuel-air combustion mixture. Illustrative of operable radiant energy absorbers which dissociate exothermically upon ignition are carbon disulfide, nitrogen oxides, acetylene, methyl acetylene, diacetylenes, ethylene, propylene, HCN, cyanogen derivatives, hydrogen-chlorine, hydrogen-bromine and the like. The spark generation or other initiation readily can be timed or programmed to coincide with the completion of the explosive fuel-air mixture in the burner tube.

When air is being passed through a burner tube during operation, the composition of the fuel-air mixture for combustion ordinarily is determined by the quantity of fuel introduced into the tube. This readily is achieved by metering the fuel into a given combustion tube in an amount and over the period of time required to provide for optimum combustion upon ignition. Ordinarily about stoichiometric fuel-air ratios are employed although a slight excess of air can be employed to assure that all the fuel is burned. If more than about 10 percent excess air is employed in the combustion step, the temperature of the gaseous exhaust products may be detrimentally lowered.

Generally in the practice of the present invention, a plurality of combustion tubes ranging from two to about twelve in number and usually from about four to about eight are employed in combination. In such operations, the resulting working gas stream produced from each tube usually is fed into a common line communicating with a turbine or other device to be driven or operated by the high energy working gas stream.

Although for some operations the process is carried out using a single combustion tube assembly, for most operations if the number of combustion tubes is less than two, it may become somewhat difficult to maintain a smooth high temperature combustion product gas feed to the venturi jet. More than twelve burner tubes can be used although with larger numbers of tubes there may be some difficulty of placement and location of these in a boiler or engine system, particularly in smaller-sized equipment.

The combustion or explosion tubes themselves can be constructed in accordance with recognized burner design. They can be equipped with a multiplicity of igniters as well as other devices to assure substantially instantaneous ignition of the fuel-air mixture in the explosion zone with complete combustion of the explosive fuel gas combustion mixture.

Preceding the entrance of the explosion zone to each burner tube there is positioned a substantially one way passage which prevents high pressure reverse fluid flow such as, for example, a pressure resistant shock wave trap, a controlled poppet or sleeve valve or an appropriate one way check valve. This one way passage, i.e. shock wave trap or check valve is of a design which assures that the combustion product gases cannot exit back through the entrance of the combustion tube but must go through the exit, i.e. exhaust, and pass to a nozzle of a turbine or other apparatus to do useful work.

In a particularly useful apparatus for carrying out the present process, cup-shaped projections located in the walls of the combustion tube preceding the actual explosion zone and which provide for streamline, low turbulent flow of gases toward the combustion zone but which simultaneously provide for self-destruction or neutralization of back pressure waves are employed as the shock wave traps. Alternatively, conventional one way check valves or other one way gas directing assemblies of a structural strength sufficient to withstand the shock waves generated during the substantially instantaneous explosive combustion of the fuel-air mixture in the explosion zone of the combustion tube can be used in the assembly.

Igniters suitable for use to assure the substantially instantaneous combustion of the fuel-air mixture in the explosion zone can be prepared or selected from a variety of electrical, chemical or radiant energy generators as set forth hereinbefore and as known to one skilled in the art.

Air inlet tubes, shock wave traps or check valves, explosive burning tubes and venturi jets can be fabricated from structural materials currently in use and designed to withstand the temperatures and pressures of operation.

The actual design of these components can be varied depending on the size of the power plant or jet engine, desired thrust, desired horsepower or kilowatts of electrical energy and the like required or desired for a given operation as is understood by one skilled in the art.

One apparatus which has been found to be particularly suitable for carrying out the present novel process is that shown in FIGURES 2-4.

This embodiment comprises a tubular combustion tube 28 having an explosion chamber 30 of enlarged diameter intermediate the ends. One end 32 is fitted with a one way check valve assembly 34. The explosion chamber 30 may be fitted around its interior wall 36 with a baffle means, e.g. a multiplicity of fins, 38, extending substantially the length of the chamber 30.

A conduit-nozzle injection means assembly 40, for injecting a fuel-air mixture into the explosion chamber, is positioned within the combustion tube 28 in the end containing the oneway check valve assembly 34 and communicating with said assembly 34. In the depicted embodiment, the conduit-nozzle assembly 40 is tubular and has an outwardly flared end 42 near the entrance of the explosion chamber 30. This serves to direct the inert gas flow towards the inner wall of the explosion chamber. The conduit 44 is of a smaller diameter than the diameter of the combustion tube 28 thereby providing an annular zone 46 between the outer wall 48 of conduit 44 and inner wall 50 of combustion tube 28. The conduit 44 on the side of the check valve assembly 34 opposite the explosion chamber 30 is fitted with a valve 52.

A second conduit 54 is connected to check valve assembly 34 and communicates with an inert gas supply (not shown) by means of valve 56.

Valves 52 and 56 both are actuated and inactivated through a timer-programmer means 58.

The exhaust section 59 of the combustion tube 28 leads to a turbine nozzle system or other apparatus (not shown) to be driven by a working gas stream generated in the combustion apparatus.

An electrical spark, chemical, high temperature resistance or other igniter means 60 of a type and construction to provide for substantially instantaneous complete ignition of a fuel-air mixture in the explosion chamber 30 is positioned therein.

Alternatively, as an igniter, a narrow diametered tube 62 can be positioned within conduit 44 of the conduit-nozzle assembly 40. This conduit 62 which is connected to a supply source (not shown) of a radiant energy absorber projects a short distance into the explosion chamber 30 and provides during operation for introduction of a pencil-like shaft of a radiant energy absorber into the fuel-air mixture to ignite the mix.

In another embodiment of the present apparatus, as shown in FIGURE 4, the section 64 of the combustion tube 28 preceding the explosion chamber 30 and which makes up the transport tube for introducing inert gas into the explosion chamber and conduit 40 for passing fuel-air mixture into the explosion chamber 30 can be designed so as to contain cup-like protrusions, shock wave traps, 66, the openings of which face the explosion chamber 30. These are spaced at irregular intervals along the inner wall surface of section 64 and the outer wall of conduit 40. As depicted in the figure, these are designed and positioned to provide a gradual slope when viewed from the inlet end of the combustion tube 28 to give streamline flow of an inert blend gas toward the explosion chamber while assuring that any combustion product gases or shock waves from ignition are turned back on themselves and undergo self-destruction thus being effectively checked. Additionally, as shown the inner wall of conduit 40 and outer wall of conduit 62 are similarly equipped to provide for entry of a fuel-air mixture into the combustion zone and shock wave traps for control of back passage of high velocity combustion products. The traps 66 are irregularly spaced along the length of the conduits to avoid setting up resonance conditions therein. In this embodiment the inert gas conduit and fuel-air supply line are connected to valve 56 and 52 as no mechanical check valves need to be used.

In operation of the depicted combustion the finned structure in the explosion chamber provides a curved path for the inert gas which passes along and between the fins 38 thus providing a minimum of turbulence in the explosion chamber 30.

The following example will serve to further illustrate the present invention but is not meant to limit it thereto.

*Example*

A turbojet engine is provided having compressed air inlets connected to four combustion tubes of the type shown in the figures, i.e. explosion tubes, through four one way check valve assemblies one each connected to the entrance of the combustion tubes. The exists of the burner tubes are directed at the nozzles discharging onto the turbine wheel blades.

In operation of the engine in accordance with the present novel process, a predetermined quantity of air (inert gas) from the inlet is passed through the one way check valve shock wave traps into the four burner tubes. In each of these a fuel-air mixture having a fuel, such as kerosene, formulated jet fuels such as JP-4 fuel, light weight petroleum fractions and the like, is metered in a sequential manner through a controlled, program controlled, valve assembly and the conduit-nozzle such that there is ignition and combustion of the fuel-air mixture in only one tube at a time. Because of the check valve shock wave traps, the resulting high pressure-high temperature explosion products can move only toward the nozzle. The forward portion of this tube is filled with unfueled air which is compressed and accelerated by the high pressure-high temperature explosion products. This unheated air becomes heated and compressed by adiabatic compression from the extra high temperature-high pressure explosion products and the so-heated slug is directed through the nozzles against the turbine blade. This operation is repeated by metering controlled quantities of fuel-air mixture and inert gas successively on a programmed basis into the remaining three tubes and igniting these in sequence. This process is continued in orderly cycles thereby to produce a smooth, high pressure-high temperature working gas stream.

Various modifications can be made in the present invention without departing from the spirit or scope thereof for it is understood that I limit myself only as defined in the appended claims.

I claim:

1. A combustion process for producting a high kinetic energy working gas stream which comprises;
    (a) providing a combustion tube having an explosion chamber and connected at its entrance a substantially one way passage which restricts reverse high pressure gas flow,
    (b) directing a predetermined quantity of an inert gas through said passage into said combustion tube,
    (c) introducing a predetermined quantity of a fuel-air combustion mixture into said explosive chamber to provide a fuel-air mixture at a ratio so as to provide a predetermined combustion product temperature and pressure,
    (d) substantially instantaneously igniting the fuel-air mixture,
    (e) absorbing the peak of the explosive energy from said explosive combustion by said inert gas thereby compressing and accelerating said inert gas,
    (f) directing the resulting gaseous mass toward a nozzle system as a high temperature-high velocity working gas stream, and
    (g) repeating the introduction of predetermined quantities of inert gas and fuel-air mixture, inert gas compressing and accelerating operation in a cyclic, orderly sequence.

2. A process for producing a high kinetic energy gaseous mass which comprises;

(a) separately introducing partially expanded inert process gases followed by a precompressed explosive fuel-oxidizer mixture into an explosion chamber,
(b) explosively firing said fuel-oxidizer mixture thereby accelerating said process gases,
(c) repeating process steps (a) and (b) on an orderly cyclic sequence, and
(d) directing the resulting high velocity-high kinetic energy working gas stream from said explosion chamber, and extracting energy therefrom.

3. A combustion apparatus for producing a high kinetic energy working gas stream which comprises in combination,
a combustion tube having an explosion chamber intermediate its ends, said explosion chamber fitted with an igniting means, said igniting means providing substantially instantaneous ignition of an explosive fuel-air mixture,
a fuel-air injection means positioned in one end of said combustion tube and communicating with said explosion chamber,
separate one way check valve assemblies connected to each of said combustion tube and said injection means at the end opposite that communicating with said explosion chamber, said check valve assemblies positioned to provide gas flow towards said explosion chamber,
a controlled fuel-air supply source connected to said injection means on the inlet side of said check valve assembly therein,
a controlled inert gas supply source connected to said combustion tube on the inlet side of said check valve assembly therein,
a flow control programmer connected to said fuel-air supply source and said inert gas supply source, said programmer providing for metering of said fuel-air mixture and inert gas into said explosion chamber, and
the other end of combustion tube defining an exhaust.

4. The apparatus as defined in claim 3 wherein the interior surface of the explosive chamber is fitted with a multiplicity of fins, said fins extending substantially the length of said chamber.

5. The apparatus as defined in claim 3 wherein the one way check valve assemblies are cup-like protrusions in the said annular zone and said fuel-air injection assembly, the opening of said protrusion facing the explosion chamber of said combustion tube, said protrusions being spaced at irregular intervals along the length of said annular zone and said injection means.

6. The apparatus as defined in claim 3 wherein the outer wall of said injection means and the inner wall of one end of said combustion tube define an annular zone, said zone communicating with a check valve assembly at the end opposite that communicating with said explosion chamber.

References Cited
UNITED STATES PATENTS

| | | | |
|---|---|---|---|
| 1,069,694 | 8/1913 | Hayot | 60—247 |
| 2,493,873 | 1/1950 | Hill | 60—39.77 X |
| 2,523,308 | 9/1950 | Kemmer et al. | 60—39.77 X |
| 2,612,749 | 10/1952 | Tenney et al. | 60—249 |
| 2,628,471 | 2/1953 | Dunbar | 60—39.77 X |
| 2,633,698 | 4/1953 | Nettel | 60—13 |
| 2,654,991 | 10/1953 | Nettel | 60—13 |
| 2,860,484 | 11/1958 | Schmidt | 60—39.77 |
| 2,888,803 | 6/1959 | Pon | 60—39.77 X |

CARLTON R. CROYLE, *Primary Examiner.*